United States Patent [19]

Sriram

[11] Patent Number: 5,739,652
[45] Date of Patent: Apr. 14, 1998

[54] METHOD AND APPARATUS FOR SENSORLESS OPERATION OF BRUSHLESS PERMANENT MAGNET MOTORS

[75] Inventor: Tillasthanam V. Sriram, Carmel, Ind.

[73] Assignee: General Motors Corporation, Detroit, Mich.

[21] Appl. No.: 770,862

[22] Filed: Dec. 20, 1996

[51] Int. Cl.⁶ .................................................. H01R 39/46
[52] U.S. Cl. ........................... 318/439; 318/138; 318/254
[58] Field of Search ........................ 363/21, 97; 318/138, 318/439, 254

[56] References Cited

U.S. PATENT DOCUMENTS

| | | | |
|---|---|---|---|
| 4,027,215 | 5/1977 | Knight et al. | 318/341 |
| 4,162,435 | 7/1979 | Wright | 318/138 |
| 4,238,717 | 12/1980 | Knight et al. | 318/341 |
| 4,459,519 | 7/1984 | Erdman | 318/254 |
| 4,492,903 | 1/1985 | Knight et al. | 318/341 |
| 4,556,827 | 12/1985 | Erdman | 318/254 |
| 4,641,066 | 2/1987 | Nagata et al. | 318/254 |
| 4,743,815 | 5/1988 | Gee et al. | 318/254 |
| 4,868,729 | 9/1989 | Suzuki | 363/21 |
| 4,876,491 | 10/1989 | Squires et al. | 318/138 |
| 4,912,378 | 3/1990 | Vukosavic | 318/254 |
| 4,928,043 | 5/1990 | Plunkett | 318/254 |
| 5,099,182 | 3/1992 | Isaacson et al. | 318/254 |
| 5,205,721 | 4/1993 | Isaacson | 417/356 |

OTHER PUBLICATIONS

"P.M. Brushless Motor Drives: A Self–Commutating System without Rotor–Position Sensors" P. Ferraris, A. Vagati, F. Villata, Istituto di Macchine Elettriche Politecnico di Torino—Torino, Italia.

"Self–Commutation of Brushless DC Motors Without Encoders", M. Jufer, Laboratoire d' Electromecanique, Ecole Polytechnique Federale de Lausanne, ch. de Bellerive 16, CM–1007 Lausanne, Switzerland.

Primary Examiner—Karen Masih
Attorney, Agent, or Firm—Vincent A. Cichosz

[57] ABSTRACT

A sensorless method and apparatus for providing commutation timing signals for a brushless permanent magnet motor extracts the third harmonic back-emf of a three-phase stator winding and independently cyclically integrates the positive and negative half-cycles thereof and compares the results to a reference level associated with a desired commutation angle.

12 Claims, 6 Drawing Sheets

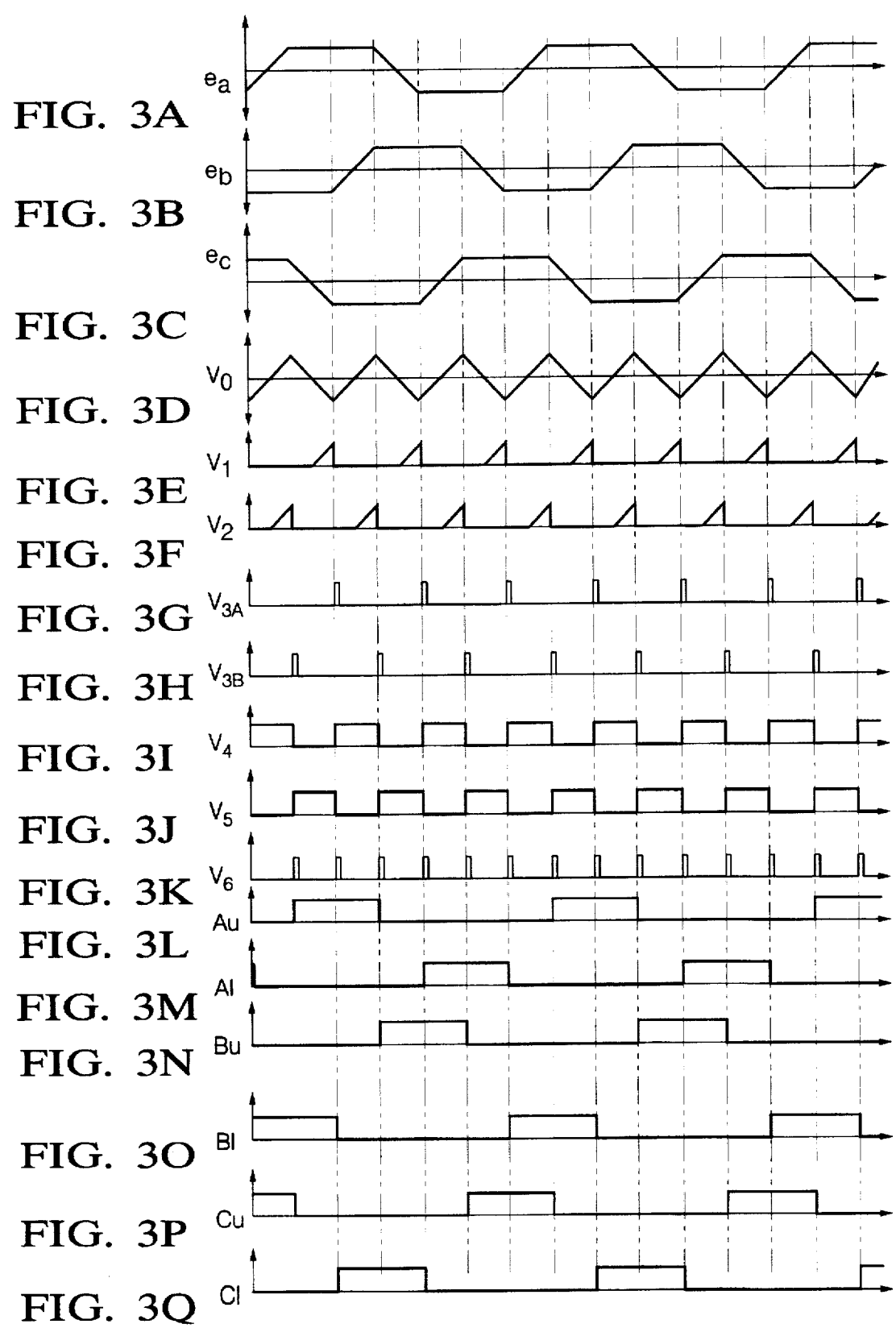

METHOD AND APPARATUS FOR SENSORLESS OPERATION OF BRUSHLESS PERMANENT MAGNET MOTORS

The Government of the United States has rights in this invention pursuant to Subcontract ZCB-3-13032 under Prime Contract No. DE-AC36-83CH10093 awarded by the U.S. Department of Energy.

TECHNICAL FIELD

The present invention is related to the field of brushless permanent magnet motor controls.

BACKGROUND OF THE INVENTION

Generally, a brushless permanent magnet motor having a rotor including at least a pair of magnetic poles and a multi-pole stator including a Y-connected poly-phase field winding requires some sort of rotor angle sense in order that various motor control objectives vis-à-vis commutation timing can be accomplished. An inverter provides modulation of the poly-phase field winding in accordance with well known techniques to provide a rotating magnetic field thereby resulting in rotor torque. Certain motor control objectives relate directly to the phase relationship of the rotor magnetic poles and the excitation of the poly-phase field windings making knowledge of such phase relationship, and hence rotor position, indispensable.

Certain prior art motor control techniques achieve rotor angular information directly from discrete sensing transducers such as conventional hall effect devices responsive to the rotor magnetic poles and having known positional relationships relative to the stator poles. While generally providing accurate angular information, such hall devices inevitably add hardware complexity, expense and system reliability penalties. Additionally, packaging constraints and motor operating environment for particular applications may preclude the use of such devices.

The desirability of sensorless operation of brushless permanent magnet motors, at least in certain applications, is generally well accepted. Various benefits including reduced hardware complexity, increased reliability and elimination of related packaging constraints may be realized in those applications to which sensorless techniques may be applied.

A variety of prior art techniques for sensorless operation of brushless permanent magnet motors have been proposed. In some of such sensorless techniques, recognition that normally one phase of the poly-phase field winding is not energized by the inverter, that is to say it is open, during a normal poly-phase conduction interval generally provides for an opportunity to poll the terminal voltage of the open phase winding which is indicative of the characteristic back-emf induced therein by the rotating magnetic field of the rotor magnetic poles. The back-emf contains information that can be used to indicate the relative angular position of the rotor with respect to the stator pole configuration.

In one general technique, the open phase back-emf is monitored to detect a zero-crossing event which together with known prior commutation or zero-crossing events may be used to establish the next commutation event. However, this technique is limited to substantially steady state or only slowly varying load situations wherein rotational frequency at consecutive commutation events are substantially similar. Additionally, the technique is also limited to lower motor loads, and lower speed operation wherein stator free-wheeling currents have decayed to zero prior to the back-emf reaching zero such that the back-emf zero-crossing remains unmasked.

In another general technique, the open phase back-emf is monitored and integrated along an interval from a zero-crossing event until a predetermined value is reached whereupon the next commutation event is initiated. However, this technique is again limited to lower motor loads, and lower speed operation wherein stator free-wheeling currents have decayed to zero prior to the back-emf reaching zero unless special modulation techniques are employed prior to the back-emf reaching zero to ensure the freewheeling current decays to zero prior to the back-emf reaching zero.

In yet another general technique, the open phase back-emf is monitored and integrated along an entire open phase interval across the zero-crossing event to derive a net back-emf. A phase-locked loop control operates upon the net back-emf to drive the net back-emf to zero thereby establishing the commutation timing in accord with the desired timing. This technique, however, is unsuitable for certain low inertia and pulsating load applications.

In another known sensorless technique the third harmonic signal from the poly-phase winding is utilized wherein the third harmonic signal is employed in a phase-locked loop to derive commutation instants which correspond to new conduction intervals. This technique, however, is not suitable for pulsating loads.

In another known sensorless technique, however relating to detecting a suitable motor starting point, pulse edges of a commutation signal derived from a zero-crossing events of a continuously integrated third harmonic signal are combined with the polarity from an open phase back-emf signal. The zero-crossing events being an integral function of the third harmonic signal correspond to third harmonic peaks which themselves occur at commutation events. The zero-crossing event of the integrated third harmonic is merely used as an expedient in extracting the desired peak information from the third harmonic signal which itself is not readily reliably detectable since the amplitude thereof may vary widely with speed variations of the rotor.

SUMMARY OF THE INVENTION

Therefore, it is desirable to provide for reliable sensorless detection of rotor position in a brushless permanent magnet motor for the purpose of generating commutation timing signals.

It is furthermore desirable that such detection be robust enough to handle rapidly changing or pulsating load torques presented to the rotor, such as for example a compressor type of load.

The present invention therefore is related to an inverter powered poly-phase brushless permanent magnet motor characterized by a star-connected poly-phase stator winding including a plurality of phase windings commonly coupled at respective first ends thereof to provide a neutral node and separately coupled at respective second ends thereof to respective phase legs of the inverter wherein each phase winding is characterized by a substantially trapezoidal back electromotive force. The voltage across all phase windings are individually sensed and summed together to provide a voltage signal rich in third harmonics of the motor back-emf. Cyclic integrations are performed on the signal for positive half-cycles and negative half cycles thereof. Preferably, the negative half-cycle integrations are achieved by inverting the negative half-cycle and integrating the inverted signal. Each separate integration is compared to reference level which corresponds to a known rotation angle of the rotor in accordance with the motor volt-second characteristics. The attainment of the reference level occurs substantially independent of rotor speed. Commutation signals are then derived from the instants at which the reference levels are achieved. Each respective integration is reset or initialized to zero and clamped at zero after it reaches the reference level at least until the other integration achieves the reference level.

In a preferred form of the commutation signal generation, first and second comparators are used to compare respective integrations to a single predetermined reference level. Integration resets are provided by a data latch which responds to the attainment of the reference level of either integration to reset and clamp the integration of the one half-cycle having achieved the reference level and enabling the integration of the other half cycle.

In one form of the invention, a frequency double responds to the data latch state to provide a pulse train of commutation timing signals. In another form of the invention, combinational logic provides a commutation pulse train from the first and second comparator outputs.

BRIEF DESCRIPTION OF THE DRAWINGS

The present invention will now be described, by way of example, with reference to the accompanying drawings, in which:

FIGS. 3A–3Q illustrate various signals at points of the motor and motor control hardware along a common angle base in accord with the present invention;

DESCRIPTION OF THE PREFERRED EMBODIMENT

The present invention is now described by way of a preferred embodiment comprising a three-phase brushless permanent magnet motor. The present invention provides for motor control, and particularly determination of commutation timing in accordance with mutually exclusive, cyclic integrations performed upon positive and negative portions of the third harmonic signal derived from the three-phase stator winding.

Figure 1:
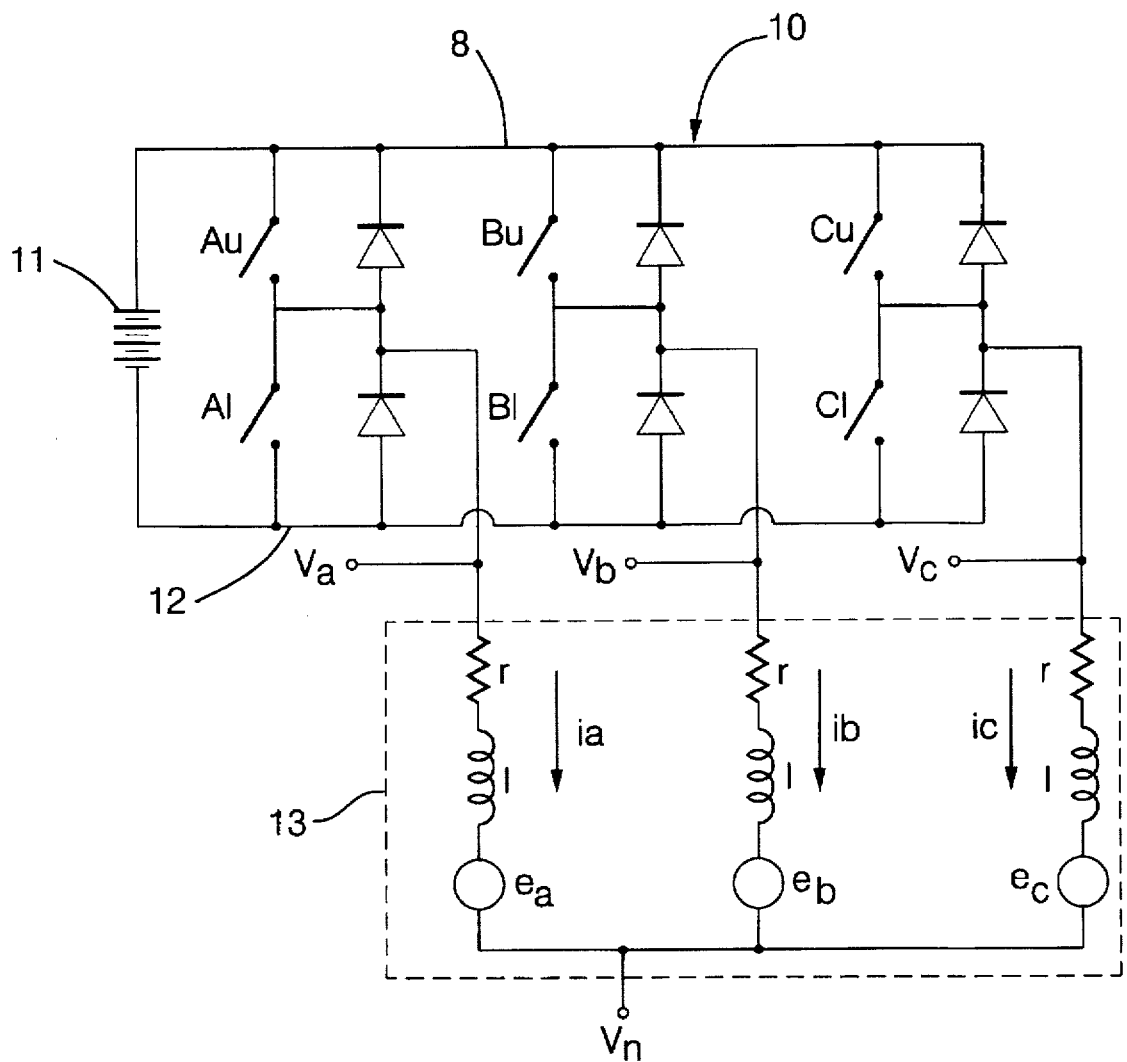
FIG. 1 illustrates a schematic of an inverter and equivalent circuit for a three-phase brushless permanent magnet motor driven thereby in accord with the present invention.

With reference first to FIG. 1, a schematic of an exemplary three-phase inverter hardware and equivalent three-phase brushless permanent magnet motor is illustrated. The inverter bridge, generally designated by the numeral 10, includes upper and lower main switching devices $A_u$, $B_u$, $C_u$, $A_l$, $B_l$, $C_l$, typically a solid state switch including respective anti-parallel diodes as illustrated. The A, B and C designations refer to the particular phase leg of the inverter comprising respective upper and lower switching devices, and the subscripts U and L designate the upper and lower switching devices of the respective legs which are coupled to the upper and lower DC rails 8 and 12, respectively. Each respective phase winding may be coupled via the associated switching device to the upper and lower DC rails 8 and 12. The DC rails are illustrated simplisticly in direct coupling to a DC source 11. It is understood, however, that auxiliary switching devices such as may be necessary in various quasi-resonant pole topologies, may be incorporated in the inverter section for providing various well known soft-switching advantages. The brushless permanent magnet motor equivalent circuit is generally designated by the numeral 13 in the figure. Each phase winding of the stator winding includes substantially equivalent phase leg resistances "r" and inductances "l". Additionally, phase leg voltage sources $e_a$, $e_b$, and $e_c$ representing back-emf in the respective phase legs are illustrated. Being a Y-coupled three-phase stator wound motor, the equivalent circuit is shown having three-phase terminals $V_a$, $V_b$, and $V_c$ and a neutral terminal or neutral node $V_n$. The general configuration of an inverter and three-phase brushless permanent magnet motor is generally well known. The description of the preferred embodiment is with respect to a three-phase inverter/motor configuration although it is recognized that other poly-phase configurations may benefit from the present invention.

Commutation, commutation events and commutation timing as used and referred to herein means the sequential commutations from one phase pattern excitation period corresponding to a predetermined one of six such independent periods to another and does not mean the high frequency modulation commutation which may be performed during any given phase pattern excitation period, such as for example pulse width modulation of the main switching devices corresponding to the presently excited phase legs.

FIGS. 3A through 3Q are hereafter selectively referenced in furtherance of the explanation of a preferred embodiment of the present invention. The various FIGS. 3A through 3Q are waveforms at various points in exemplary motor control hardware or of characteristic voltages of the motor hardware. All of the various FIGS. 3A through 3Q share a common time or angle base.

With specific reference to the waveforms of FIGS. 3A–3C, the characteristic trapezoidal back-emf signals for each of the three-phases are illustrated. In the case of the present embodiment wherein a three-phase configuration is used, each period through which a respective phase winding exhibits a maximum back-emf is substantially 120 electrical degrees. Each maximum back-emf periods, including both positive and negative maximums, is separated from adjacent maximum emf periods by open phase periods of substantially 60 electrical degrees as represented by the diagonal portions of the waveforms illustrated.

Figure 2A:
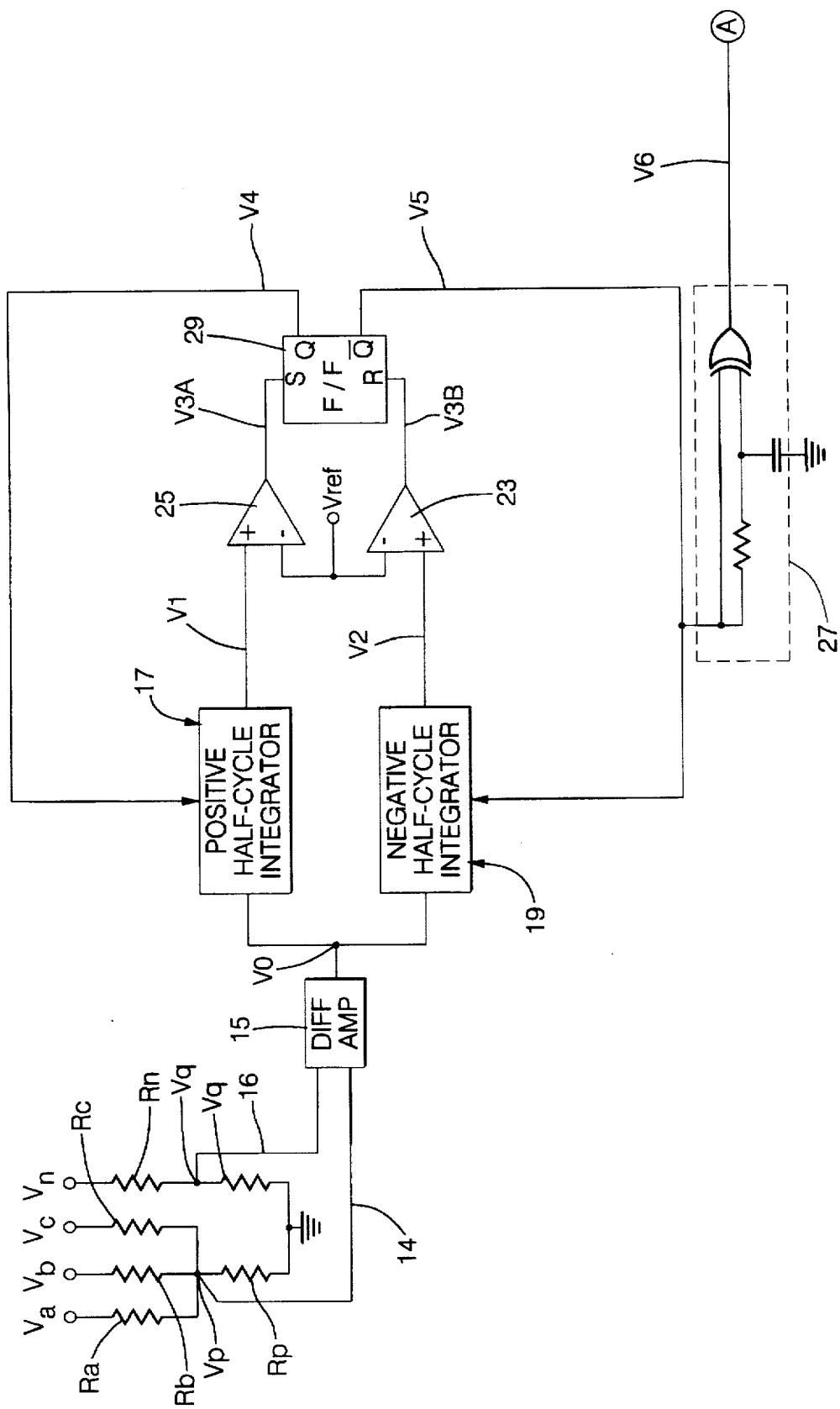
FIG. 2A illustrates a preferred embodiment of motor control hardware for developing commutation timing signals in accord with the present invention.
Figure 2B:
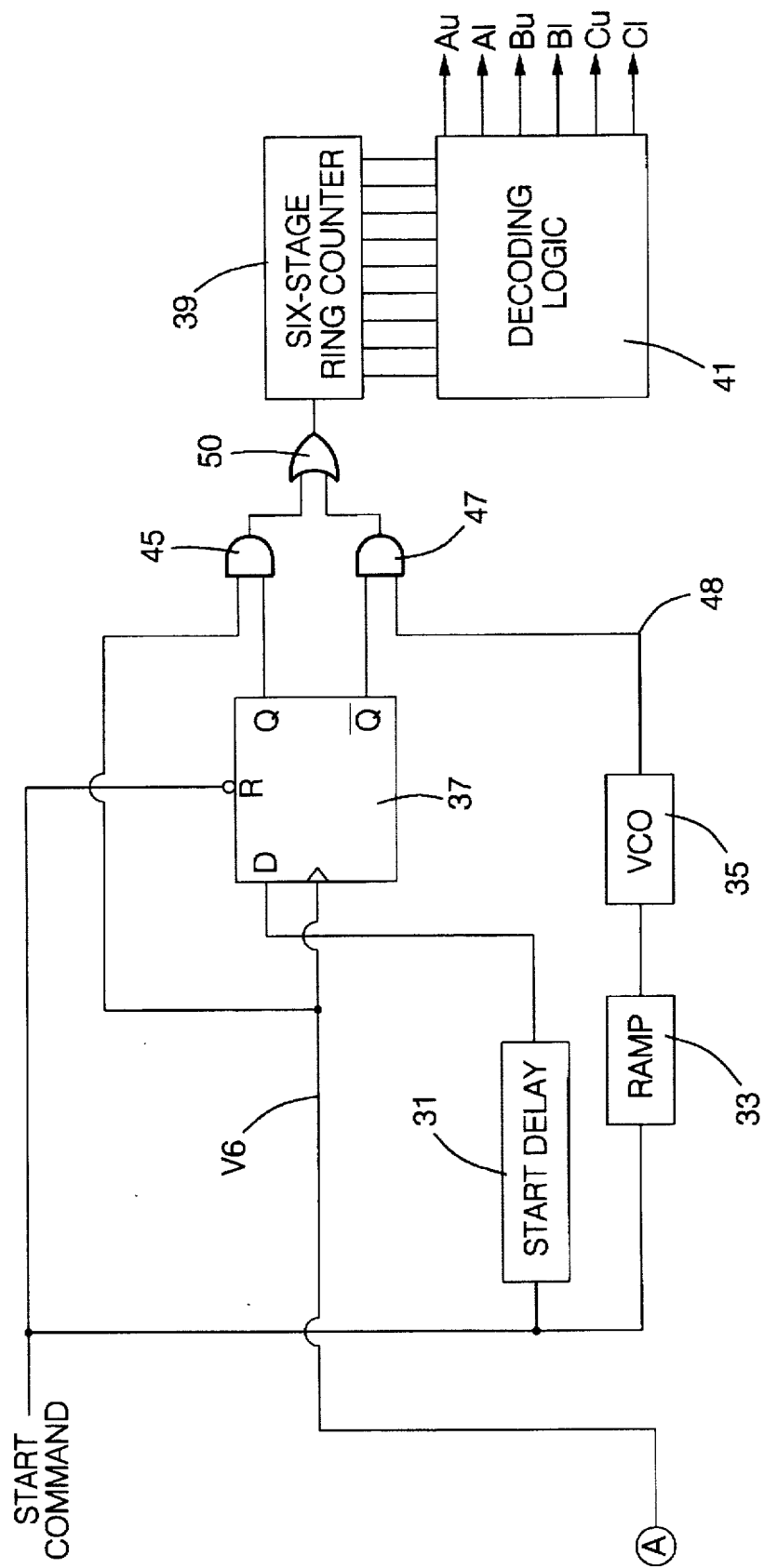
FIG. 2B illustrates a preferred embodiment of motor control hardware for start-up operation of a brushless permanent magnet motor and switch over to synchronous operation in accord with the present invention.

Referring now to FIGS. 2A and 2B, a schematic block diagram of exemplary motor control hardware in accordance with the present invention is illustrated. FIG. 2A corresponds generally to motor control hardware effective to develop necessary commutation timing signals after start-up of the motor and FIG. 2B corresponds generally to motor control hardware effective to selectively provide a start-up sequence of commutation timing signals or the commutation timing signals developed in accordance with the motor control hardware of FIG. 2A.

The three-phase terminals $V_a$, $V_b$, and $V_c$ and neutral terminal $V_n$ are interfaced with the control hardware of FIG. 2A as follows. A star-connected resistor network has matched resistors $R_a$, $R_b$, and $R_c$ coupled to the various phase terminals $V_a$, $V_b$, and $V_c$. The star-connected resistor network common coupling point is connected to one end of differential amplifier 15 via line 14. Similarly, a neutral sense resistor $R_n$ is coupled to the neutral terminal $V_n$ at one end with the other end thereof coupled to the other input of the differential amplifier 15 via line 16. The inputs to the differential amplifier correspond to the summation of the voltage of phase terminals $V_a$, $V_b$, and $V_c$ and to the voltage at the neutral terminal $V_n$. The actual voltages input to the differential amplifier 15 are proportionally scaled voltages $V_p$ and $V_q$, scaled in accordance with the selected values of the resistors $R_a$, $R_b$, $R_c$, $R_n$, and lower leg resistors $R_p$ and $R_q$. Hence the voltages input to the differential amplifier, $V_p$ and $V_q$, are within the levels of the differential amplifiers allowable voltage swings such that the section is not overloaded and driven into saturation. To retain proper relative scaling between $V_p$ and $V_q$, the following relationships are maintained:

$$R_n = R_a/3 = R_b/3 = R_c/3$$

and $$R_p = R_q$$

The output $V_0$ from the differential amplifier 15 is essentially a scaled replica of the third harmonic signal from the motor's three-phase winding back-emf. While other odd-order harmonics of the back-emf are present in the summed voltage of phase terminals $V_a$, $V_b$, and $V_c$, such other odd-order harmonics are of substantially insignificant amplitude for the present purposes. Referring to FIG. 3D, a representative waveform of $V_0$ is illustrated showing the substantially saw-toothed characteristic of the third harmonic signal. As is generally well known, the positive and negative peaks of the third harmonic substantially correspond to desired commutation events for the brushless permanent magnet motor.

The scaled replica of the third harmonic signal $V_0$ is input to positive half-cycle integrator 17 and negative half-cycle integrator 19. The integrators 17 and 19 are operative upon mutually exclusive regions of the third harmonic cycle. Furthermore, each integrator 17 and 19 is selectively reset and enabled by a respective clamping signal $V_4$ and $V_5$. The clamping signals $V_4$ and $V_5$ in the present embodiment are complementary; that is to say each signal is the inverse of the other. Therefore, one of the integrators is reset and clamped as the other of the integrators is enabled. However, even though enabled, actual signal integration of $V_0$ only occurs for the particular positive or negative half-cycle thereof for which the integrator is operative.

The positive half-cycle integrator 17 is, as the name suggests, effective to integrate $V_0$ for positive values thereof and when enabled (unclamped) by the clamping signal $V_4$. Likewise, the negative half-cycle integrator 19 is, as the name suggests, effective to integrate $V_0$ for negative values thereof and when enabled (unclamped) by the clamping signal $V_5$. Each integrator therefore provides a respective integration signal $V_1$ and $V_2$.

In operation, the clamping signals are effective to enable the respective integrators at an angle whereat the third harmonic is of opposite sense to which the integrator is effective. Therefore, the enabled integrator stands ready to begin integration upon the third harmonic zero crossing and thereafter continues integration until reset and clamped by reversal of the complementary clamping signals.

Figure 4A:
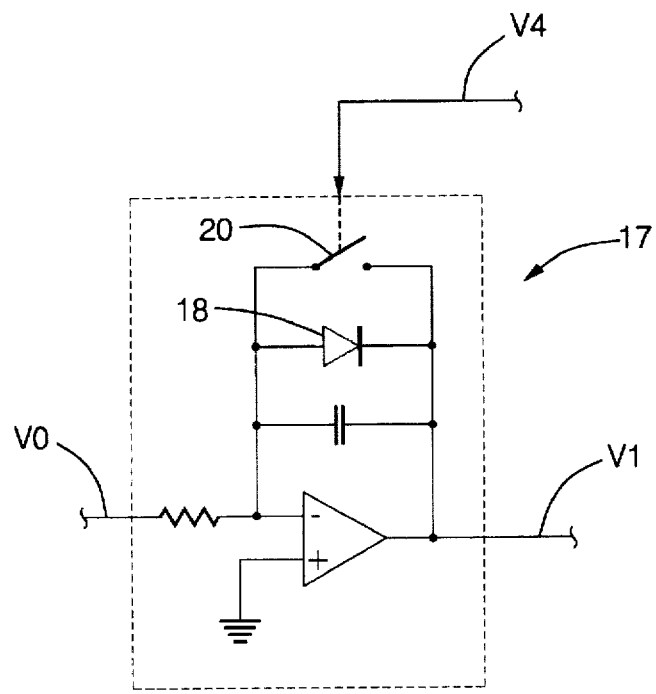
FIGS. 4A and 4B illustrate preferred hardware configurations for half-cycle integrators as illustrated in FIG. 2A in accord with the present invention; and, FIG. 5 illustrates alternative motor control hardware for developing commutation timing signals in accord with the present invention.
Figure 4B:
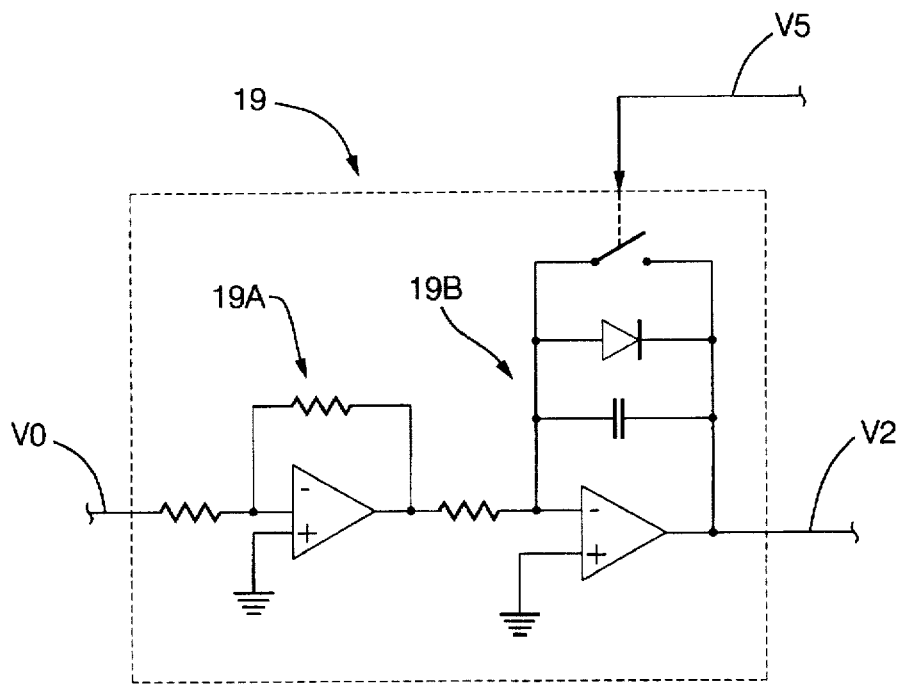

With reference to FIGS. 4A and 4B, exemplary positive and negative half-cycle integrators are detailed. The positive half-cycle integrator 17 of FIG. 4A comprises a differential amplifier with a capacitor in feed back across the output and inverting input thereof. The non-inverting input is, of course, coupled to ground. Only negative values of $V_0$ are integrated by virtue of diode 18 coupled across the output and inverting input of the differential amplifier. Resetting and clamping of the integrator is accomplished by way of solid state switch 20 such as a conventional mosfet also coupled across the output and inverting input. During integration, the clamping signal is low and thus the solid state switch is open allowing integration of positive voltages at the inverting input. When the solid state switch is closed by clamping signal going high, the integration ceases and the output of the differential amplifier becomes clamped to a low state. The negative half-cycle integrator 19 of FIG. 4A comprises an inverting stage 19A and a positive half-cycle integrator stage 19B identical in construction and operation to the previously described positive half-cycle integrator 17.

With the objective still in mind to establish commutation timing signals, and further with the understanding that for most motor operating speeds the peaks of the third harmonic signal correspond to optimal commutation times, it is desirable to effectuate correspondence of the clamping signals reversal to the respective peaks of the third harmonic signal. Being a constant volt-second machine, the brushless permanent magnet motor has the characteristic that the amplitude of the third harmonic signal is directly proportional to speed while the time-period of the third harmonic signal is inversely proportional to speed. Therefore, regardless of speed or speed changes and actual third harmonic amplitude, the volt-time area of the positive or negative sense of the waveform or for any given definite angular interval thereof is substantially constant. For any given reference value scaled within the scaled range of the volt-time characteristics of the motor then exists a unique electrical angle corresponding thereto. It follows then that the volt-time area corresponding to the integration from the zero-crossing to the respective local peak of the third harmonic waveform is substantially definite, constant and predictable. By comparing for substantial equivalency each respective output of the integrators to a predetermined reference corresponding to the third harmonic signal peak, base commutation angles can readily be derived therefrom which correspond in angle to the third harmonic signal peaks. Additionally, and advantageously, increasing or decreasing the reference voltage provides advanced or retarded commutation angles, respectively, relative to the base commutation angle as described.

The comparisons of the respective integrations is accomplished in the present embodiment by way of a pair of comparators 25 and 23. Both comparators have the respective inverting input coupled to a reference voltage $V_{ref}$ which, for third harmonic peak detections and establishment of base commutation timing in accord therewith is set to a base value thereof. The value of $V_{ref}$ is preferably adjustable in accordance with motor speed such that at higher rotational speeds whereat stator winding impedance effects results in significant current response lags relative to rotor rotation angle $V_{ref}$ may be reduced to effectuate an advance in the commutation timing to account for such response lag. The non-inverting input to comparator 25 is coupled to the positive half-cycle integration signal $V_1$ and the non-inverting input to comparator 23 is coupled to the negative half-cycle integration signal $V_2$. Hence, when the respective integration signal $V_1$ or $V_2$ exceeds the reference voltage $V_{ref}$ the corresponding comparator output signal, labeled $V_{3A}$ or $V_{3B}$ and referred to as latch signal in the present embodiment, goes high. A latch signal $V_{3A}$ or $V_{3B}$ sets or resets, respectively, data latch 29 which in the present embodiment is a positive edge triggered S-R flip-flop. In the case of positive half-cycle integrations, a setting of data latch 29 occurs and signal $V_4$ goes high thereby resetting the positive half-cycle integrator and clamping the output $V_1$ thereof low. In turn this results in the high output of comparator 25 going low. Clamping signal $V_5$, the inverse of clamping signal $V_4$ goes low upon the setting of data latch 29 to thereby release the clamp upon the negative half-cycle integrator 19 to enable it upon the zero-crossing of the third harmonic signal as described. The sequence would then essentially repeat itself for the negative half-cycle integration following the zero-crossing of the third harmonic signal whereby the data latch 29 gets reset, negative half-cycle integrator 19 gets reset and clamped, and positive half-cycle integrator 17 is enabled. The sequence described effectively provides a set or reset pulse to data latch 29 at a predetermined angle in accordance with the reference voltage $V_{ref}$. In the exemplary motoring mode of operation, the latch signal $V_{3A}$ in FIG. 3G can be seen to correspond to the lower main switching device commutation signals in FIGS. 3L, 3O, and 3Q, and the latch signal $V_{3B}$ in FIG. 3H can be seen to correspond to the upper main switching device commutation signals in FIGS. 3K, 3N, and 3P. When used to determine commutation timing signals in a generating mode such as, for example, in a brushless permanent magnet alternator or traction motor operating in well known regeneration mode, the latch signal $V_{3A}$ in FIG. 3G would correspond to the upper main switching device commutation signals in FIGS. 3K, 3N, and 3P, and the latch signal $V_{3B}$ in FIG. 3H would correspond to the lower main switching device commutation signals in FIGS. 3L, 3O, and 3Q.

In the present embodiment illustrated in FIG. 2A, clamping signal $V_5$ is input to frequency doubler 27 which provides commutation timing pulses in accordance with the state changes of the data latch 29 by responding to the rising and falling edges of clamping signal $V_5$. Alternatively, clamping signal $V_4$ may be used to provide the input to frequency doubler 27 to effectuate the same end result.

Figure 5:
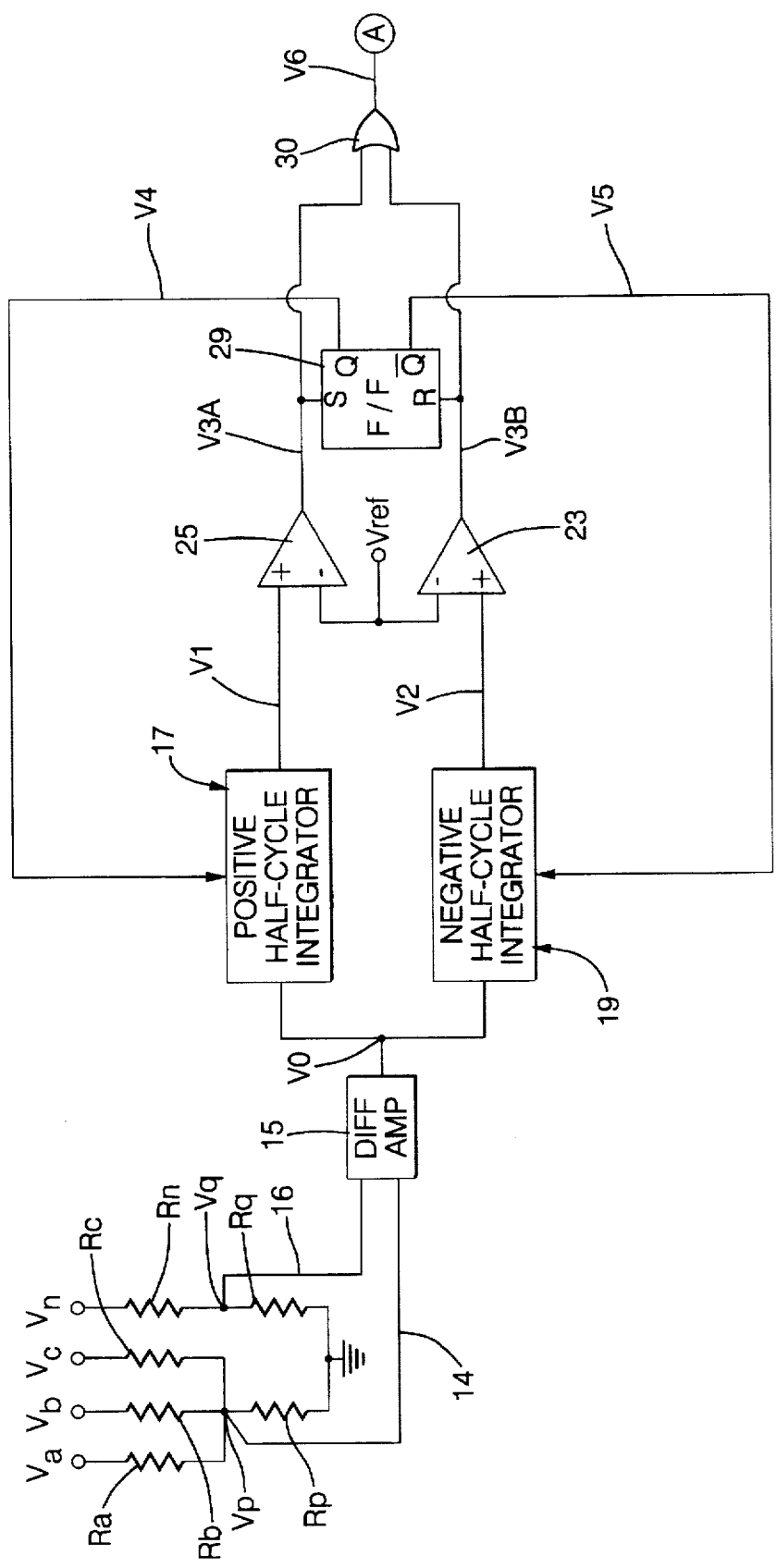

FIG. 5 illustrates an alternative embodiment of the functions performed by the circuit of FIG. 2A. Identical features between the two embodiments are designated with identical labels. The embodiment of FIG. 5 provides for commutation timing pulses by feeding the latch signals $V_{3A}$ and $V_{3B}$ from comparators 25 and 23, respectively, to combinational logic 30 illustrated as an OR gate effective to consolidate the two latch signals. The commutation timing signal $V_6$ output therefrom comprises the commutation timing pulses.

The various signals $V_1$, $V_2$, $V_{3A}$, $V_{3B}$, $V_4$, $V_5$, and $V_6$ are illustrated in FIGS. 3E through 3K which represent a steady state motor speed with commutation timing substantially contemporaneous with the peaks of the third harmonic signal and in synchronism.

The signal $V_6$ may be fed to a conventional six-stage ring counter whose output is decoded to provide gate drive signals for main switching devices $A_u$, $B_u$, $C_u$, $A_l$, $B_l$, $C_l$ of the inverter as shown in FIGS. 3L through 3Q. However, it is generally necessary to also provide a start-up sequence for the motor such that the motor attains a speed whereat the third harmonic signal is actually detectable and to ensure that synchronous operation is attained. Exemplary motor control hardware for such a start-up function is illustrated in the schematic of FIG. 2B. The commutation timing signal $V_6$ from FIG. 2A is shown in FIG. 2A also as a clocking input to D-flip-flop 37. Another input to the exemplary circuit shown is a start command which in the present embodiment is low at zero or near zero motor speed conditions and which goes high signaling the desirability of motor operation. The start command is input to the reset R terminal of D flip-flop 37, a start delay circuit 31 and a voltage ramp circuit 33. The low state of the start command provides a reset the D flip-flop 37 thereby setting the Q and Q bar outputs to 0 and 1 logic levels respectively thus enabling gate 47 to transfer the logic signal on line 48 and disabling gate 45 from transferring the commutation timing signal on line $V_6$. The D input to the D flip-flop is coupled to the output of start delay circuit 31 which is reset to a low state when the start command is low and is set to a high state following a predetermined delay when the start command goes high. Therefore, prior to the expiration of the delay following the start command going high, any commutation timing signals $V_6$ will continue to clock a low state to the Q output and a high state to the Q bar output of D flip-flop. When the start command goes high, ramp circuit 33 increases its output voltage from zero at a predetermined rate. The output voltage is fed to voltage controlled oscillator 35 which produces a start-up pulse train on line 48 whose frequency increases from zero in accord with the ramp circuit 33 voltage output. The pulse train is passed through gate 47 for so long as Q bar remains high. When the start delay circuit goes high, the next commutation timing signal clocks the high state through the D flip-flop to set the Q output high and the Q bar output low. This reverses the gating function of gates 45 and 47 whereby gate 45 is now enabled to pass signal V6 and gate 47 blocks the signal on line 48 from propagation therethrough. Therefore, it is understood that gate 50 passes the output signal from the one of gates 45 and 47 that is enabled. For a predetermined amount of time in accordance with start delay 31 from the time the start command goes high, the increasing frequency start-up pulse train on line 48 propagates through gate 50 whereafter the commutation timing signal $V_6$ propagates therethrough.

The one of the start-up pulse train and the commutation timing signals is provided as an input to a conventional six-stage ring counter 39 whose outputs are decoded by conventional decoding logic 41 to produce the gate drive signals for main switching devices $A_u$, $B_u$, $C_u$, $A_l$, $B_l$, $C_l$ of the inverter 10.

While the invention has been described with respect to certain preferred embodiments, it is anticipated that certain modifications will be apparent to those having ordinary skill in the art. Therefore, the preceding description of such preferred embodiments is intended to be taken by way of non-exhaustive example of the invention as claimed below.

I claim:

1. An apparatus for developing commutation signals for an inverter powered brushless permanent magnet motor having a star-connected poly-phase stator winding including a plurality of phase windings commonly coupled at respective first ends thereof to provide a neutral node and separately coupled at respective second ends thereof to respective phase legs of the inverter, each phase winding characterized by a substantially trapezoidal back electromotive force thereacross, the apparatus comprising:

means for summing voltages across all phase windings and providing an output voltage signal proportional to the sum;

a positive half-cycle integrator having an input coupled to the output voltage signal and adapted to integrate only positive portions of the output voltage signal to provide a first integration signal;

a negative half-cycle integrator having an input coupled to the output voltage signal and adapted to integrate only negative portions of the output voltage signal to provide a second integration signal; and, a commutation timing signal generator coupled to the first and second integration signals effective to provide a commutation timing signal whenever either of the first and second integration signals attains a predetermined threshold level.

2. An apparatus as claimed in claim 1 wherein said means for summing the respective voltages comprises:

a neutral sense resistor having respective first and second ends, the first end thereof coupled to the neutral node of the star-connected poly-phase stator winding;

a star connected resistor network having a plurality equal in number to the plurality of phase windings of voltage sense resistors commonly coupled at respective first ends thereof to provide a summing node and separately coupled at respective second ends thereof to respective second ends of the plurality of phase windings; and, a differential amplifier coupled to the summing node of said star-connected resistor network and to the second end of the neutral sense resistor, said differential amplifier providing the output voltage signal.

3. An apparatus as claimed in claim 1 wherein said commutation timing signal generator further comprises an integrator reset circuit effective to reset and clamp the one of the positive and negative half-cycle integrators that most recently attained the predetermined threshold level and to enable the other of the positive and negative half-cycle integrators.

4. An apparatus as claimed in claim 1 wherein said commutation timing signal generator comprises:

first and second comparators having respective inverting inputs commonly coupled to a predetermined reference voltage, said first comparator having a respective non-inverting input coupled to the first integration signal and the second comparator having a respective non-inverting input coupled to the second integration signal, the first comparator providing a first commutation timing signal corresponding to one of upper and lower main switching devices and the second comparator providing a second commutation timing signal corresponding to the other of upper and lower main switching devices; and, an integrator reset circuit responsive to the first and second commutation signals to reset and clamp the one of the positive and negative half-cycle integrators that most recently attained the predetermined reference voltage and to enable the other of positive and negative half-cycle integrators.

5. An apparatus as claimed in claim 4 wherein said motor is operating in a motoring mode wherein the first commutation timing signal corresponds to the lower main switching devices and the second commutation timing signal corresponds to the upper main switching devices.

6. An apparatus as claimed in claim 4 wherein said motor is operating in a regenerative mode wherein the first commutation timing signal corresponds to the upper main switching devices and the second commutation timing signal corresponds to the lower main switching devices.

7. An apparatus as claimed in claim 4 further comprising combinational logic effective to consolidate the first and second commutation signals.

8. An apparatus as claimed in claim 4 wherein said integrator reset circuit comprises a data latch having set and reset inputs and inverted and non-inverted outputs, said set input coupled to one of the first and second commutation timing signals and responsive thereto to establish a first state of said inverted and non-inverted outputs and said reset input coupled to the other of the first and second commutation timing signals and responsive thereto to establish a second state of said inverted and non-inverted outputs, one of said inverted and non-inverted outputs of said data latch coupled to one of said positive and negative half-cycle integrators and the other of said inverted and non-inverted outputs of said data latch coupled to the other of said positive and negative half-cycle integrators such that the one of the positive and negative half-cycle integrators coupled to the one of the first and second comparators that caused a most recent state change of the inverted and non-inverted outputs of the data latch is reset and clamped by the one of the inverted and non-inverted outputs coupled thereto and the other of the positive and negative half-cycle integrators coupled to the other of the first and second comparators that did not cause the most recent state change of the inverted and non-inverted outputs of the data latch is enabled by the other of the inverted and non-inverted outputs coupled thereto.

9. An apparatus as claimed in claim 1 wherein said commutation timing signal generator comprises:

first and second comparators having respective inverting inputs commonly coupled to a predetermined reference voltage, said first comparator having a respective non-inverting input coupled to the first integration signal and the second comparator having a respective non-inverting input coupled to the second integration signal, the first comparator providing a first latch signal upon the first integration signal exceeding the predetermined reference voltage and the second comparator providing a second latch signal upon the second integration signal exceeding the predetermined reference voltage;

a data latch having set and reset inputs and inverted and non-inverted outputs, said set input coupled to one of the first and second latch signals and responsive thereto to establish a first state of said inverted and non-inverted outputs and said reset input coupled to the other of the first and second latch signals and responsive thereto to establish a second state of said inverted and non-inverted outputs, one of said inverted and non-inverted outputs of said data latch coupled to one of said positive and negative half-cycle integrators and the other of said inverted and non-inverted outputs of said data latch coupled to the other of said positive and negative half-cycle integrators such that the one of the positive and negative half-cycle integrators coupled to the one of the first and second comparators that caused a most recent state change of the inverted and non-inverted outputs of the data latch is reset and clamped by the one of the inverted and non-inverted outputs coupled thereto and the other of the positive and negative half-cycle integrators coupled to the other of the first and second comparators that did not cause the most recent state change of the inverted and non-inverted outputs of the data latch is enabled by the other of the inverted and non-inverted outputs coupled thereto; and a frequency doubler coupled to one of the inverted and non-inverted outputs of the data latch to provide a series of commutation timing signals.

10. A method of determining commutation timing signals for an inverter powered brushless permanent magnet motor having a star-connected poly-phase stator winding including a plurality of phase windings commonly coupled at respective first ends thereof to provide a neutral node and separately coupled at respective second ends thereof to respective phase legs of the inverter, each phase winding characterized by a substantially trapezoidal back electromotive force thereacross, the method comprising:

providing a signal proportional to the summation of voltages across all respective phase windings;

cyclically integrating positive portions of the signal until a first predetermined threshold is reached;

cyclically integrating negative portions of the signal until a second predetermined threshold is reached; and, whereupon each of the integrations reaching the respective thresholds, providing a commutation timing signal substantially contemporaneously therewith.

11. A method of determining commutation timing signals as claimed in claim 10 wherein the steps of cyclically integrating further comprises the step:

integrating respective portions of the signal substantially from points when the signal crosses a substantially zero voltage threshold into the respective portions;

resetting the respective integrations to substantially zero when the respective threshold is reached; and clamping the respective integrations to substantially zero until the point when the signal crosses the substantially zero voltage threshold into the respective portions.

12. In a constant volt-second brushless permanent magnet motor having a permanent magnet rotor and a three-phase stator winding including a plurality of phase windings commonly coupled at a neutral node in a star-configuration to provide three phase input terminals, each of said three phase input terminals coupled to corresponding phase legs of an inverter, each phase winding characterized by a substantially trapezoidal back electromotive force thereacross, a method of providing commutation timing signals for synchronous motor operation comprising the steps:

sensing voltage at each of the three phase input terminals and the neutral node;

summing the sensed voltages corresponding to each of the three phase input terminals;

providing a voltage signal proportional to the difference between the summed sensed voltages corresponding to each of the three phase input terminals and the sensed voltage at the neutral node;

separately integrating positive half-cycles of the voltage signal and inverted negative half-cycles of the voltage signal from substantially zero volts to a predetermined level, said predetermined level corresponding to a desired angle of rotation of the motor at which commutation timing signal are to be generated;

providing a commutation timing signal at each occurrence of the respective integrated half-cycles attaining the predetermined level; and resetting and suspending the one of the half-cycle integrations having attained the predetermined level at least until the other one of the half-cycle integrations attains the predetermined level.

\* \* \* \* \*